Patented Jan. 6, 1942

2,268,780

UNITED STATES PATENT OFFICE 2,268,780

WATER-SOLUBLE SULPHAPYRIDINE DERIVATIVE AND PROCESS OF MAKING IT

Horace A. Shonle, Indianapolis, Ind., assignor to Eli Lilly and Company, Indianapolis, Ind., a corporation of Indiana No Drawing. Application November 6, 1939, Serial No. 303,023

3 Claims. (Cl. 260—211)

My invention relates to certain therapeutically effective water-soluble sugar derivatives of sulphapyridine, and to the process of making them.

I have found that certain sugars which have a terminal aldehyde group are capable of combining with sulphapyridine, to produce compounds which are highly water-soluble, which have reduced toxicity as compared with sodium sulphapyridine, which are substantially as effective therapeutically per unit weight of sulphapyridine content as is sulphapyridine itself, which produce water solutions that are not alkaline (as sodium sulphapyridine solutions are very strongly) but are very slightly acid in reaction, and which will form very stable water solutions that are neutral or slightly alkaline by the use of suitable neutral or slightly alkaline buffers.

My products are produced by an interaction of the aldehyde group of the sugar with the amino group of the sulphapyridine, with the elimination of water. While there may be some question of the precise structure of the final compound, on account of possible isomeric variations, it is convenient to consider the reaction as shown in the following general equation.

(1) 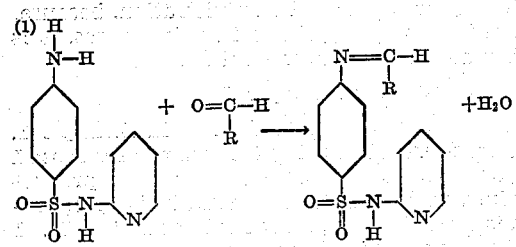

where R is any radical which when attached to an aldehyde group produces an aldose, and the group

may undergo isomeric rearrangement. Among the aldoses which may be used as the second reactant in the foregoing reaction are: xylose, arabinose,—either $d$ or $l$; rhamnose, galactose, glucose, and maltose.

Of these, I prefer glucose and maltose.

When glucose is the aldose used, the general reaction, not taking into account the isomeric rearrangements in the final product, is as follows:

(2) 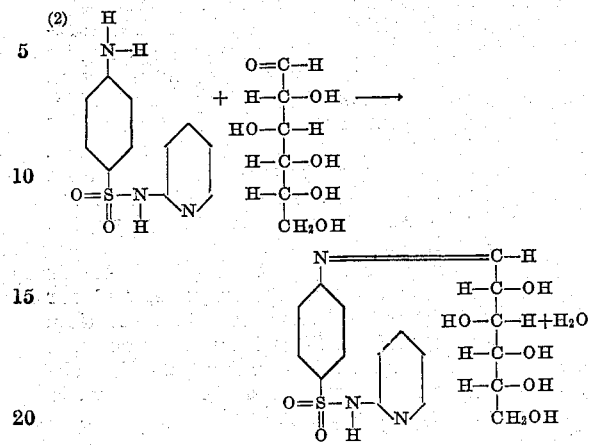

The final product so obtained may partly or wholly rearrange itself isomerically, to produce compounds such as:

(3) 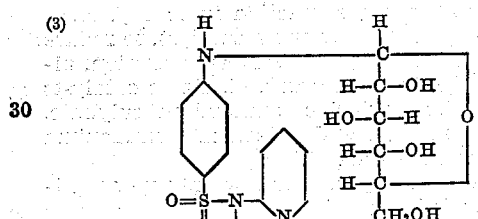

and (4) 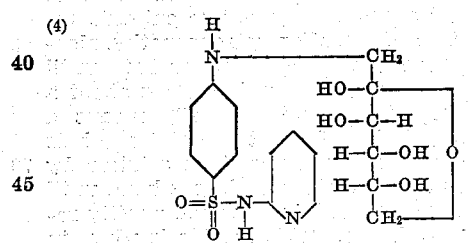

When maltose is the aldose used, the general reaction, again not taking into account the isomeric rearrangements in the final product, is as follows:

(5)
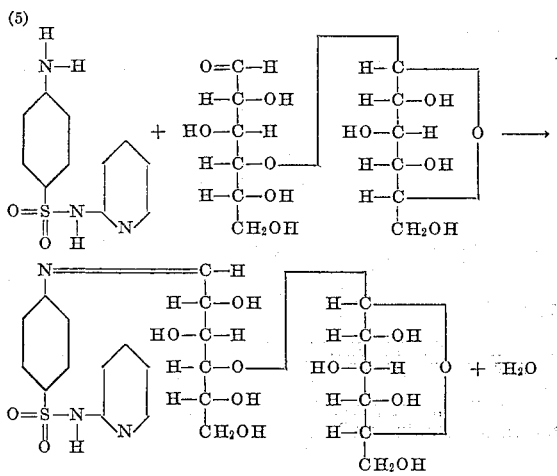

The final product so obtained may also partly or wholly rearrange itself isomerically, in the same general manner as when glucose was the aldose used.

The reactions for producing my new products are carried out in a suitable solvent, desirably methyl alcohol or water; in which the reactants are put, and in which at least one of the reactants as well as the final product are both quite soluble. The reactants are most desirably in about molecular proportions when methyl alcohol is used, but when water is the solvent used a several-fold excess of the sugar is necessary. The most satisfactory solvent which I have found is methyl alcohol. I have not been able to produce satisfactory results with ethyl alcohol as the solvent.

The mixture of the solvent and the reactants is refluxed until solution is complete, and for some time longer to insure complete reaction, usually about half an hour longer. When the solvent is an organic one, the final solution obtained is then evaporated, desirably in vacuo, to leave the desired product in solid form as a residue.

When the solvent is water, I deem it preferable not to attempt to remove the solvent, but prefer to administer the final product in the water solution containing the excess of sugar.

In carrying out the reaction in methyl alcohol, I find it desirable to use a catalyst, to reduce the reaction time and to avoid discoloration, although that is not necessary. Suitable catalysts are ammonium chloride, ammonium sulphate, ammonium nitrate, and indeed any ammonium salt of a mineral acid.

Examples of my process and of my new products are as follows:

Example 1

I put 60 grams of sulphapyridine, 46.3 grams of glucose, and 2 grams of ammonium chloride (as a catalyst) into 500 cc. of anhydrous methyl alcohol, and reflux the whole on a steam bath until complete solution has occurred, and for about a half an hour longer; which usually means a total refluxing period of about two and one-half hours. I concentrate the resultant solution by evaporation in vacuo, with or without heat, until a dry solid residue is obtained, which usually requires about 12 hours. This residue is white in color, and very light and fluffy. I grind up this residue, as in a mortar.

The product thus obtained is my desired final product, which has the structure indicated at the right of Formula 2, with possible isomeric rearrangements as in Formulas 3 and 4. This final product, which is a nitrogen aldehydic-glucoside of sulphapyridine, may conveniently be called glucosulphapyridine. It is soluble in ethyl or methyl alcohol. It is very soluble in water, and produces a water solution of about pH 6.5. That water solution is not very stable, for it readily decomposes within a few days, to form a precipitate of sulphapyridine. But if the water solution is buffered, by the addition of a phosphate buffer, to raise the pH to about pH 7.0–7.6, the solution becomes quite stable, with no noticeable decomposition or precipitation of sulphapyridine for at least several months.

This glusosulphapyridine, as thus prepared, has a levo specific optical rotation in water solution of about $[\alpha]_D = -43°$ C. If it is prepared without using a catalyst, however, (which then requires a longer refluxing period, of about five hours), it has a smaller levo specific optical rotation in water solution, of about $[\alpha]_D = -11°$, and is slightly brown in color.

I do not know the reason for this difference in optical rotation, but the product with either optical rotation is about equally effective and has the same general properties. It has no definite melting point, but chars on heating to 100° C. It has a very bitter taste. It is found to be quite effective, on either oral or parenteral administration, in combating streptococcic and pneumococcic infections. It is at least as effective as is either sulphapyridine or sodium sulphapyridine, when compared on the basis of sulphapyridine content; and on that same comparison is only about one-fourth as toxic as is sodium sulphapyridine. It has the further great advantage over sulphapyridine itself that it is very water-soluble; and it has the further advantage over sodium sulphapyridine that its aqueous solution is sufficiently near neutral so that it may be administered parenterally with no discomfort or ill effects, such as sloughing of tissue, whereas the alkalinity of water solutions of sodium sulphopyridine is so great that it is a drawback to its parenteral administration.

The sodium salt of glucosulphapyridine may be produced, if desired, and is about as effective as is the glucosulphapyridine itself; but it is less desirable for parenteral administration, because, like sodium sulphapyridine in this respect, it is highly alkaline in water solution.

Example 2

I follow the same procedure as in Example 1, save that instead of using 46.3 grams of glucose I use 83.6 grams of maltose. The final product obtained when a catalyst is used in its preparation is white in color, and very light and fluffy. I preferably grind it up, as in a mortar.

This final product, like that of Example 1, is a nitrogen aldehydic-glucoside of sulphapyridine; and to distinguish it from the product of Example 1 it may conveniently be called maltosulphapyridine. Its solubility properties are substantially the same as those of glucosulphapyridine. The specific optical rotation of maltosulphapyridine in water solution is dextro, of about $[\alpha]_D = 48°$.

Maltosulphapyridine, like glucosulphapyridine, is found to be very effective in combating streptococcic and pneumococcic infections, on either oral or parenteral administration. Its intravenous toxicity is about the same as that of glucosulphapyridine, based on the content of sulphapyridine; so that, like glucosulphapyridine, its therapeutic ratio is high in comparison with that of sodium sulphapyridine. Also like glusosulphapyridine, maltosulphapyridine forms a water solution which is fairly close to neutrality, with the advantages that that has over the highly alkaline water solutions which sodium sulphapyridine forms; and such water solutions may readily be buffered to slight alkalinity, as with a phosphate buffer.

The sodium salt of maltosulphapyridine may be produced, if desired, and is about as effective as is the maltosulphapyridine itself; but it is less desirable for parenteral administration, because, like sodium sulphapyridine in this respect, it is highly alkaline in water solution.

*Example 3*

Example 1 may be repeated with xylose, arabinose (either *d* or *l*), rhamnose, or galactose as the sugar, in place of the glucose of Example 1. When any of these other sugars is used, the amount used is desirably about the molecular equivalent of 46.3 grams of glucose.

All of these sugars, when thus reacted with sulphapyridine, produce nitrogen aldehydic-glucosides of sulphapyridine; and all their final products so obtained are found to be effective in the treatment of streptococcic and pneumococcic infections; and all are highly water-soluble, to produce water solutions that are fairly close to neutrality and that can be readily adjusted to slight alkalinity (about pH 7.0–7.6) by suitable buffers, such as a phosphate buffer. These are all well tolerated, with high effectiveness and relatively low toxicity. None of them has definite melting points, but all char on being heated. The approximate specific optical rotations in water solution are as follows:

| Compound: | $[\alpha]_D$ |
|---|---|
| Xylosulphapyridine | −16° |
| d-Arabinosulphapyridine | + 6° |
| l-Arabinosulphapyridine | − 6° |
| Rhamnosulphapyridine | +76° |
| Galactosulphapyridine | −67° |

*Example 4*

In the preceding examples I have used anhydrous methyl alcohol as the solvent. But with any of the sugars which have been named I may also use water as the solvent; although in that case I use a several-fold molecular excess of the sugar with respect to the sulphapyridine.

For instance:

I put 50 grams of sulphapyridine and about 250 grams of glucose into about 330 cc. of water, and reflux the whole on an oil bath at a temperature of about 110°–120° C., until complete solution is effected and desirably for about half an hour longer—usually for about two to three hours in all. By that time complete solution has occurred; but the solution is fairly dark brown in color. This solution contains the desired final product, which is glucosulphapyridine, with the unreacted glucose also present and perhaps probably in part caramelized to produce the brown color.

This solution is in a very convenient concentration of the glucosulphapyridine, and I rather prefer to use it without either concentration or dilution. But, if desired, it may be concentrated to some extent, by evaporation in vacuo, and may be diluted by the addition of more water.

*Example 5*

Instead of using glucose as the aldose, as in Example 4, I may use instead maltose, xylose, lactose, *d* or *l* arabinose, rhamnose, or galactose; with generally similar results.

I claim as my invention:

1. An aqueous solution of the reaction product of sulphapyridine with an aldose selected from the class which consists of xylose, d-arabinose, l-arabinose, rhamnose, galactose, glucose, and maltose, said solution having a pH between 7.0 and 7.6.

2. An aqueous solution of glucosulphapyridine having a pH between 7.0 and 7.6.

3. An aqueous solution of xylosulphapyridine having a pH between 7.0 and 7.6.

HORACE A. SHONLE.